US011171914B2

(12) United States Patent
Dreyer

(10) Patent No.: US 11,171,914 B2
(45) **Date of Patent: *Nov. 9, 2021**

(54) SYSTEMS AND METHODS FOR AUTOMATIC INVENTORY AND DNS RECORD GENERATION

(71) Applicant: Level 3 Communications, LLC, Broomfield, CO (US)

(72) Inventor: Bryan J. Dreyer, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/140,182

(22) Filed: Jan. 4, 2021

(65) Prior Publication Data

US 2021/0126893 A1 Apr. 29, 2021

Related U.S. Application Data

(63) Continuation of application No. 16/559,400, filed on Sep. 3, 2019, now Pat. No. 10,893,018.

(60) Provisional application No. 62/729,246, filed on Sep. 10, 2018.

(51) Int. Cl.

*H04L 29/12* (2006.01)
*H04L 12/24* (2006.01)

(52) U.S. Cl.

CPC ...... *H04L 61/1511* (2013.01); *H04L 41/0213* (2013.01); *H04L 41/069* (2013.01); *H04L 41/0816* (2013.01); *H04L 41/22* (2013.01); *H04L 61/2061* (2013.01); *H04L 61/3025* (2013.01)

(58) Field of Classification Search

CPC ............ H04L 61/1511; H04L 41/0213; H04L 41/069; H04L 41/0816; H04L 41/22; H04L 61/2061; H04L 61/3025

See application file for complete search history.

(56) References Cited

U.S. PATENT DOCUMENTS 8,095,648 B2 * 1/2012 MacLeod ................ H04L 41/00 709/224
10,523,501 B2 * 12/2019 Riley .................. H04L 41/0806
10,735,996 B2 * 8/2020 Mehta ................. H04W 28/085
10,743,080 B2 * 8/2020 Dai ..................... H04L 41/0213
2003/0005100 A1 * 1/2003 Barnard ............ H04L 29/12113 709/223
2007/0237141 A1 * 10/2007 Marchese ........... H04L 41/0853 370/389

(Continued)

*Primary Examiner* — Jerry B Dennison

(57) ABSTRACT

Aspects of the present disclosure include systems and methods for automatically scanning a network for network devices, retrieving and storing device information associated with any identified network devices, and updating records of a DNS based on the retrieved device information. The updated records of the DNS may include the IP address of a given network device and a device name that is automatically generated from the retrieved device information using a set of naming rules applied to the device information. Accordingly, subsequent queries including the device names may be submitted to the DNS to retrieve the corresponding IP addresses. The resulting device names generated by applying the naming rules may be based on, among other things, logical or physical properties of the network devices.

18 Claims, 9 Drawing Sheets

(56) References Cited

U.S. PATENT DOCUMENTS

| | | | | |
|---|---|---|---|---|
| 2007/0283005 | A1* | 12/2007 | Beliles | H04L 41/0816 709/224 |
| 2008/0189405 | A1* | 8/2008 | Zarenin | H04L 29/06 709/224 |
| 2009/0116404 | A1* | 5/2009 | Mahop | H04L 41/12 370/254 |
| 2010/0293269 | A1* | 11/2010 | Wilson | H04L 41/5054 709/224 |
| 2011/0039513 | A1* | 2/2011 | Carlstrom | G08B 25/08 455/404.1 |
| 2013/0275574 | A1* | 10/2013 | Hugard, IV | H04L 41/12 709/224 |
| 2013/0275575 | A1* | 10/2013 | Hugard, IV | H04L 63/1408 709/224 |
| 2015/0052231 | A1* | 2/2015 | Sun | H04L 41/0803 709/223 |
| 2015/0215276 | A1* | 7/2015 | Bhagwat | H04L 61/2015 709/220 |
| 2016/0173450 | A1* | 6/2016 | Mircescu | G06F 9/542 726/14 |
| 2016/0212223 | A1* | 7/2016 | Yang | H04L 61/2015 |
| 2018/0034923 | A1* | 2/2018 | Mendonca | H04L 67/36 |
| 2018/0212849 | A1* | 7/2018 | Hobgood | H04L 43/0852 |
| 2020/0084178 | A1* | 3/2020 | Dreyer | H04L 41/12 |
| 2021/0126893 | A1* | 4/2021 | Dreyer | H04L 41/12 |

* cited by examiner

SYSTEMS AND METHODS FOR AUTOMATIC INVENTORY AND DNS RECORD GENERATION

TECHNICAL FIELD

Aspects of the present disclosure generally relate to tools to facilitate network management and monitoring and, more particularly, to systems and methods for automatically updating an inventory of network devices within a network and domain name system (DNS) records to facilitate improved access to the network devices.

BACKGROUND

Telecommunication may include a numerous interconnected network devices for providing various network-related functions including, without limitation, routing, filtering, network interconnection, switching, bridging, signal repeating, multiplexing, demultiplexing, and the like. Management of the devices of the network is often conducted by a management team or administrator of the network operating in a network management center. The network management center may include computing devices that monitor for alarms or other performance indicators from devices within the network and troubleshoot issues that may arise to keep the network performing as needed.

As networks continue to expand and more devices are utilized within the network, management of the devices of the network has become difficult and time-consuming. To aid in managing the network, a complete and accurate inventory of the network devices may be obtained and maintained for use by administrators or devices of the network management center. In addition, the information stored in the network inventory may be difficult to parse through to find the necessary information when an alarm in the network is detected, especially for large networks. Thus, a method of parsing the information of the inventory to quickly and intuitively access network devices to obtain device information, to check device status, to provide software and firmware updates, to reconfigure the devices, and to perform other similar tasks is similarly important to maintaining network operation and health.

It is with these observations in mind, among many others, that aspects of the present disclosure were conceived and developed.

SUMMARY

One implementation of the present disclosure may take the form of a network management system comprising a network management device comprising a processor and a non-transitory computer readable medium storing instructions that, when executed by the processor, cause the network management device to execute operations. Such operations may include receiving, in response to transmitting a plurality of requests for response, a response from a responding network device of a network, wherein each request of the plurality of requests for response comprises a destination address included in a range of Internet Protocol (IP) addresses associated with the network and transmitting, based on the response from the responding network device, a request for information associated with the responding network device. The operations may also include generating a unique device name for the responding network device, and updating a domain name server (DNS) server with a DNS record associated with the responding network device, the DNS record comprising the unique device name and an IP address associated with the responding network device.

Another implementation of the present disclosure may take the form of a method of managing a telecommunications network. The method may include the operations of accessing, by a network management computing device and via a first internet protocol (IP) address of a range of IP addresses, device information associated with a network device of a network, the range of IP addresses associated with the network and generating, via one or more instructions for configuring a device name, at least one unique device name for the network device. The method may also include the operations of updating a domain name system (DNS) server to include a record for the network device, the record including the first IP address of the device and the unique device name and transmitting, to the DNS server, a DNS request to retrieve the IP address of the network device, the request comprising the unique device name of the network device.

Yet another implementation of the present disclosure may take the form of a communications network comprising a networking device addressable via a first Internet Protocol (IP) address and a network management device. The network management device may be configured to receive, in response to transmitting a plurality of requests for response, a response from the networking device, wherein each request of the plurality of requests for response comprises a destination address included in a range of IP addresses associated with a network, the first IP address of the range of IP addresses and transmit, to the networking device and addressed via the first IP address, a request for device information. The network management device may further be configured to generate, via an instruction for configuring a device name and in response to receiving information from the networking device in response to the request for device information, at least one unique device name for the networking device, transmit, via an Application Programming Interface (API) and to a Domain Name System (DNS) server, a DNS record comprising the first IP address and the at least one unique device name for the networking device, and transmit, to the DNS server, a DNS request to retrieve the first IP address of the networking device, the DNS request comprising the unique device name of the networking device.

DETAILED DESCRIPTION

Aspects of the present disclosure include systems and methods for maintaining an inventory of network devices within a network, managing Internet Protocol (IP) addresses of the network through a Domain Name System (DNS) architecture, and using the inventory and DNS records to facilitate fast and easy access to those devices. More specifically, this disclosure provides systems and methods for automatically scanning a network for network devices, retrieving and storing device information associated with any identified network devices, and updating records of a DNS based on the retrieved device information. Among other things, the updated records of the DNS may include the IP address of a given network device and a device name that is automatically generated from the retrieved device information using a set of naming rules applied to the device information. Accordingly, subsequent queries including the device names may be submitted to the DNS to retrieve the corresponding IP addresses. The resulting device names generated by applying the naming rules may be based on, among other things, logical or physical properties of the network devices. As a result, the device names may be relatively intuitive for operators, technicians, engineers, and other personnel to use (particularly as compared to IP addresses or other similar identifiers) when accessing to the network devices, developing scripts for performing various functions within the network, or performing similar tasks.

Figure 1:
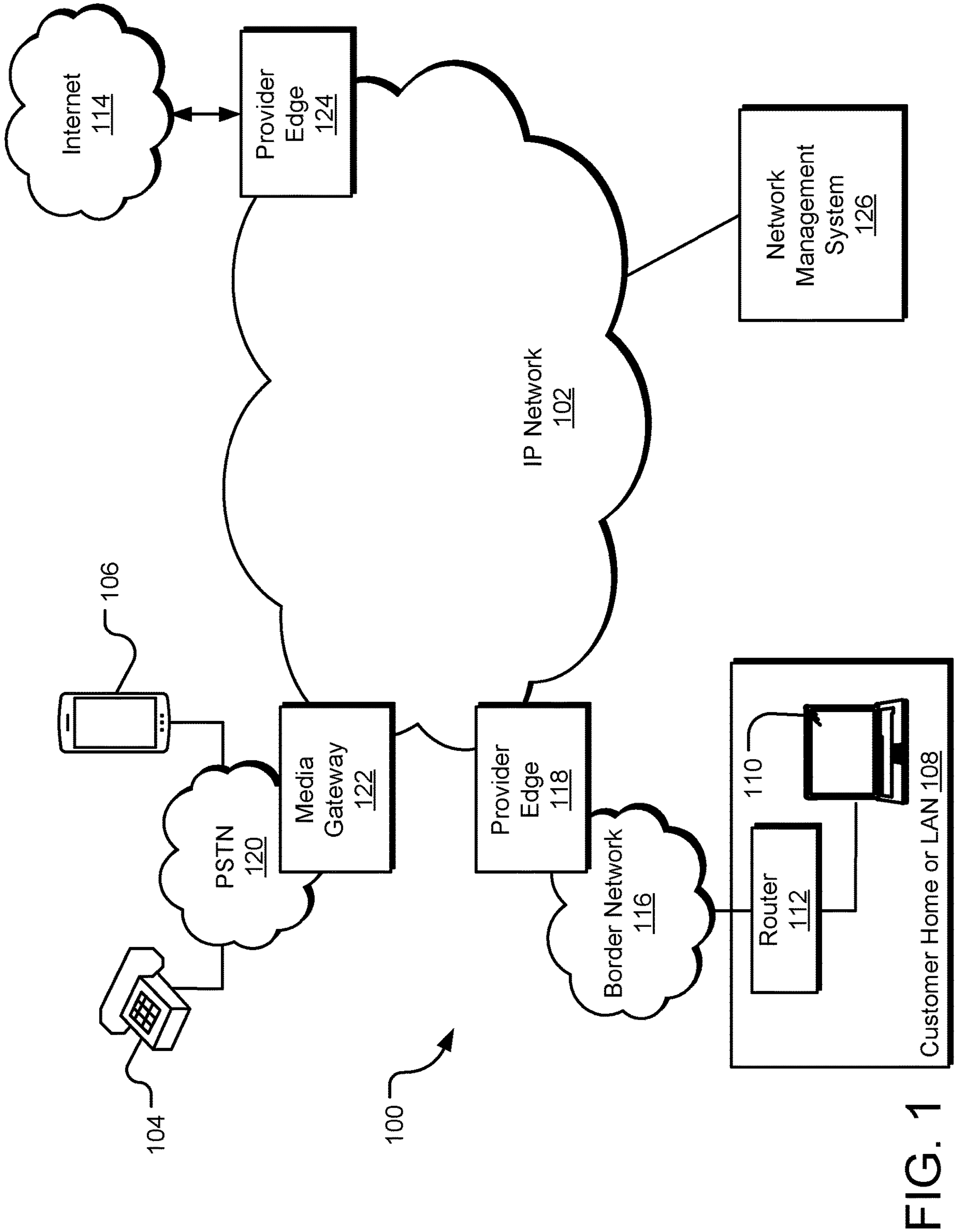
FIG. 1 schematic diagram illustrating an exemplary Internet Protocol (IP) operating environment in accordance with one embodiment.

In FIG. 1, a typical telecommunications network configuration 100 is shown from which an inventory of network devices and information may be stored in an inventory and used to generate one or more DNS records associated with the network inventory. In particular, FIG. 1 is a schematic diagram illustrating an exemplary Voice over Internet Protocol (VoIP) operating environment 100 in accordance with one embodiment of the present disclosure. In general, the environment 100 provides for establishing communication sessions between network users and/or for providing one or more network services to network users. For example, a customer to the network 100 may request a Virtual Private Network (VPN) service to one or more endpoints through the operating environment 100, may request Internet access, may utilize a communication device to communicate with another communication device connected to the network 102, and the like. In one implementation, the environment 100 may include a VoIP network 102, which may be provided by a wholesale network service provider to provide for the routing of communications between end points or devices. While the environment 100 of FIG. 1 shows a configuration using the VoIP network 102; it should be appreciated that portions of the network may also include non IP-based routing. For example, network 102 may include devices utilizing time division multiplexing (TDM) or plain old telephone service (POTS) switching. In general, the network 102 of FIG. 1 may include any communication network devices known or hereafter developed.

The VoIP network 102 includes numerous components such as, but not limited to, gateways, routers, servers, and registrars, which enable communication and/or provides services across the VoIP network 102. In some instances, the network 102 may provide for interaction and communication between the VoIP network 102 and other entities, such as the one or more customer home or business local area networks (LANs) 108 and the Internet 114 to provide access to the Internet by users of the customer network 108.

Customer network 108 can include communication devices such as, but not limited to, a personal computer or a telephone 110 connected to a router/firewall 112. Although shown in FIG. 1 as computer 110, the communication devices of the customer home network 108 may include any type of communication device that receives a multimedia signal, such as an audio, video or web-based signal, and presents that signal for use by a user of the communication device. The communication and networking components of the customer network 108 enable a user at the customer network to communicate via the VoIP network 102 to other communication devices, such as another customer 104 via network 120. Access to the Internet may also be provided through the network 102. Components of the customer network 108 are typically home- or business-based, but they can be relocated and may be designed for easy portability. For example, the communication device 110 may be wireless (e.g., cellular) telephone, smart phone, tablet or portable laptop computer.

In some instances, the customer network 108 may connect to the VoIP network 102 via a border network 116, such as one provided by an Internet Service Provider (ISP). The border network 116 is typically provided and maintained by a business or organization such as a local telephone company or cable company. The border network 116 may provide network/communication-related services to their customers via the IP network 102. In contrast, communication device 104 and or communication device 106 may access, and be accessed by, the VoIP network 102 via a public switched telephone network (PSTN) 120 operated by a local exchange carrier (LEC) and connected to the network 102 through edge device 122. In still other embodiments, the customer network 130 may connect directly to the network 102. Communication via any of the networks can be wired, wireless, or any combination thereof. For ease of instruction, only three communication devices 104, 106, 110 are shown communicating with the VoIP network 102; however, numerous such devices, and other devices, may be connected with the network, which is equipped to handle enormous numbers of simultaneous calls and/or other IP-based communications.

An operator of the VoIP network 102 may configure the network in any manner to facilitate the routing of communications through the network to connect communication devices and/or provide services to the customers of the network. For example, the network 102 may include a series of interconnected networking devices, such as routers and switches within the network 102 that receive a communication, analyze the communication to determine a destination device, and route the communication to a connected networking device to get the communication closer to a destination or egress point. Such devices may include any physical or logical component of the network 102 utilized to provide telecommunication services to a customer. For example, a network 102 may provide a transmission route between provider edge 118 and provider edge 124 to connect the customer network 108 to the Internet 114. Configuration of the network 102 thus supports the routing of packets or communications between the various networks, devices, and customers connected to the network.

As mentioned above, an administrator may manage the devices and operation of the network 102. In one example, a network control center may be included in or in communication with the network 102 to monitor the status of one or more of the network devices and configure the network as needed to provide services to the customers of the network. To communicate with the various devices, the network 102 may include a management layer network that connects each of the devices to the network control center such that a devices within or associated with the network control center may communicate with the devices of the network to obtain information, status, alarms, and the like from the network devices. Further, a network management system 126 may be connected to or otherwise in communication with the network to aid in the management of the network devices. Although shown in FIG. 1 as separate from network 102, the network management system 126 may, in some instances, be logically located within the network 102. In still other instances, the network management system 126 may connect to the management network (or network 102) through any connection to the network, such as through the Internet 114 or through a provider edge device. The operations of the network management system 126 to automatically generate a network device inventory and domain name system (DNS) records of such devices is described in more detail below.

Figure 2A:
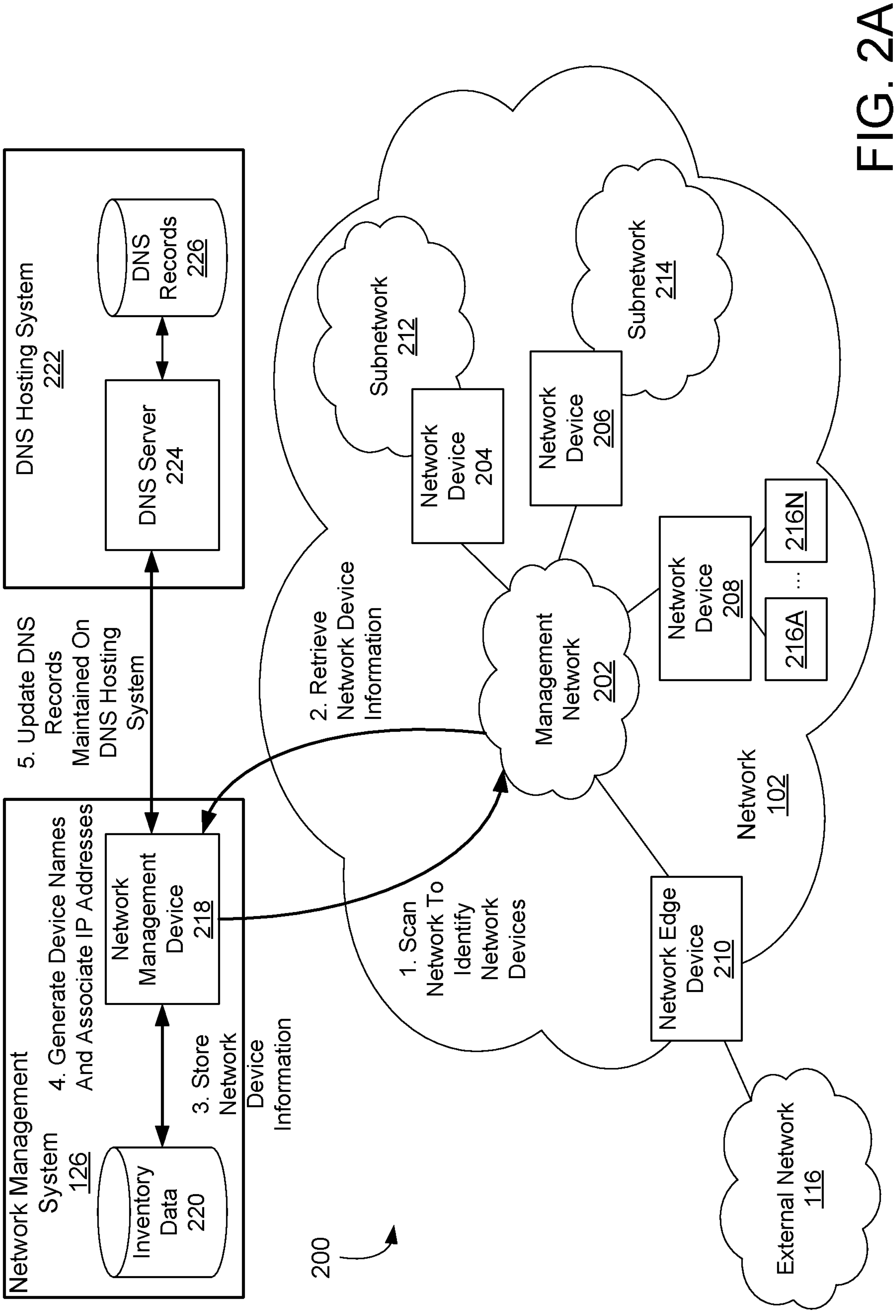
FIG. 2A is an example network environment including automatic inventory and domain name system (DNS) record generation functionality in accordance with one embodiment.

FIG. 2A is a schematic illustration of a network environment 200 including a system for generating and maintaining a network device inventory and corresponding domain name system (DNS) records for accessing the network devices of the inventory. The network environment 200 includes several components of the network environment 100 described above. For example, the network environment 200 may include a network 102 including multiple network devices 204-210 for providing various network-related functions. Each network device 204-210 may correspond to a physical device or may be a virtual instance of a physical device implemented in software to provide the services of the network 102 to one or more customers of the network.

Network devices 204-210 within the network 102 may include, among others, one or more edge devices (such as network device 210) to facilitate connection to and communication with external networks 116. In addition, the network 102 may include one or more connected subnetworks, such as subnetworks 212 and 214. Each of such subnetworks 212-214 may include a respective collection of computing and network devices and may be connected to one or more networking devices (such as network device 204 for subnetwork 212 and network device 206 for subnetwork 214) for facilitating communication between devices of the subnetwork and other portions of the network 102, including other subnetworks. Each network device may also be connected to one or more other devices. For example, network device 208 is connected to devices 216A-216N, to facilitate communication between devices 216A-216N and/or between devices 216A-216N and other devices within the network environment 100.

To facilitate communications and routing of packets within the network 102, each network device 204-210 may be assigned one or more unique Internet Protocol (IP) addresses that identifies the device to other devices. In some instances, each port of a network device may be assigned an IP address. In general, every networking device that communicates with other networking device, whether within network 102 or within other networks, may be accessed via a unique IP address for that device. In some instances, each network device 204-210 may be assigned at least one of an Internet Protocol (IP) version 4 (IPv4) or an IP version 6 (IPv6) address. For purposes of the present disclosure, reference to an IP address should be understood to refer to one or both of an IPv4 address and an IPv6 address.

As discussed above, one or more of the network devices 204-210 may connect to an internal communications network, referred to herein as the management network 202. The management network 202 is a portion of the network 102 that is utilized by a management center or management devices to connect to or otherwise communicate with the network devices 204-210. The communications transmitted over the management network 202 may include configuration commands to configure the network devices 204-210, alarms generated during operation of the devices, requests for device status from the operations center and responses from the network devices 204-210, and other communications that provide for the management and configuration control of the devices of the network 102. The network devices 204-210 may also be accessed through other networks, such as the Internet, discussed in more detail below.

As illustrated in FIG. 2A, the network environment 200 may further include the network management system 126 configured to scan the network 102 to identify and retrieve information from the network devices 204-210. To facilitate such functionality, the network management system 126 may include one or more network management computing devices 218 capable of connecting to the management network 202 (or other network) and communicating with the network devices 204-210. An inventory data collection 220, which may, for example, be in the form of one or more connected databases and/or data tables, may be included in or otherwise in communication with the network management system 126 to store information obtained from the network devices 204-210. The process by which the network management system 126 obtains and stores network device information is described in more detail below.

The network environment 200 may also include a domain name system (DNS) hosting system 222 for providing DNS functionality related to the network 102. The DNS hosting system 222 generally includes one or more DNS servers 224 in communication with a collection of stored DNS records 226. The DNS records 226 may be stored within the DNS server 224 or may be separate from the server. Further, the DNS hosting system 222 may, in some instances, include a plurality of DNS servers 224 arranged in a hierarchical arrangement. The DNS hosting system 222 may be further be managed by a network administrator or may be managed by a third party. In general, the DNS records 226 include, among other things, records correlating domain names to addresses (e.g., A records for IPv4 addresses and AAAA records for IPv6 addresses) and records for aliasing one domain name to another (e.g., CNAME records). The DNS server 224 is generally configured to, among other things, receive and execute DNS queries including domain names against the DNS records 226 and to provide corresponding address information. The DNS server 224 is further configured to modify the DNS records 226, such as by adding new records or deleting or modifying existing records as new or updated DNS information is provided to the DNS server 224. Notably, the multiple networked servers of the DNS hosting system 222 may provide, among other things, redundant and/or geographically localized DNS functionality.

Figure 2B:
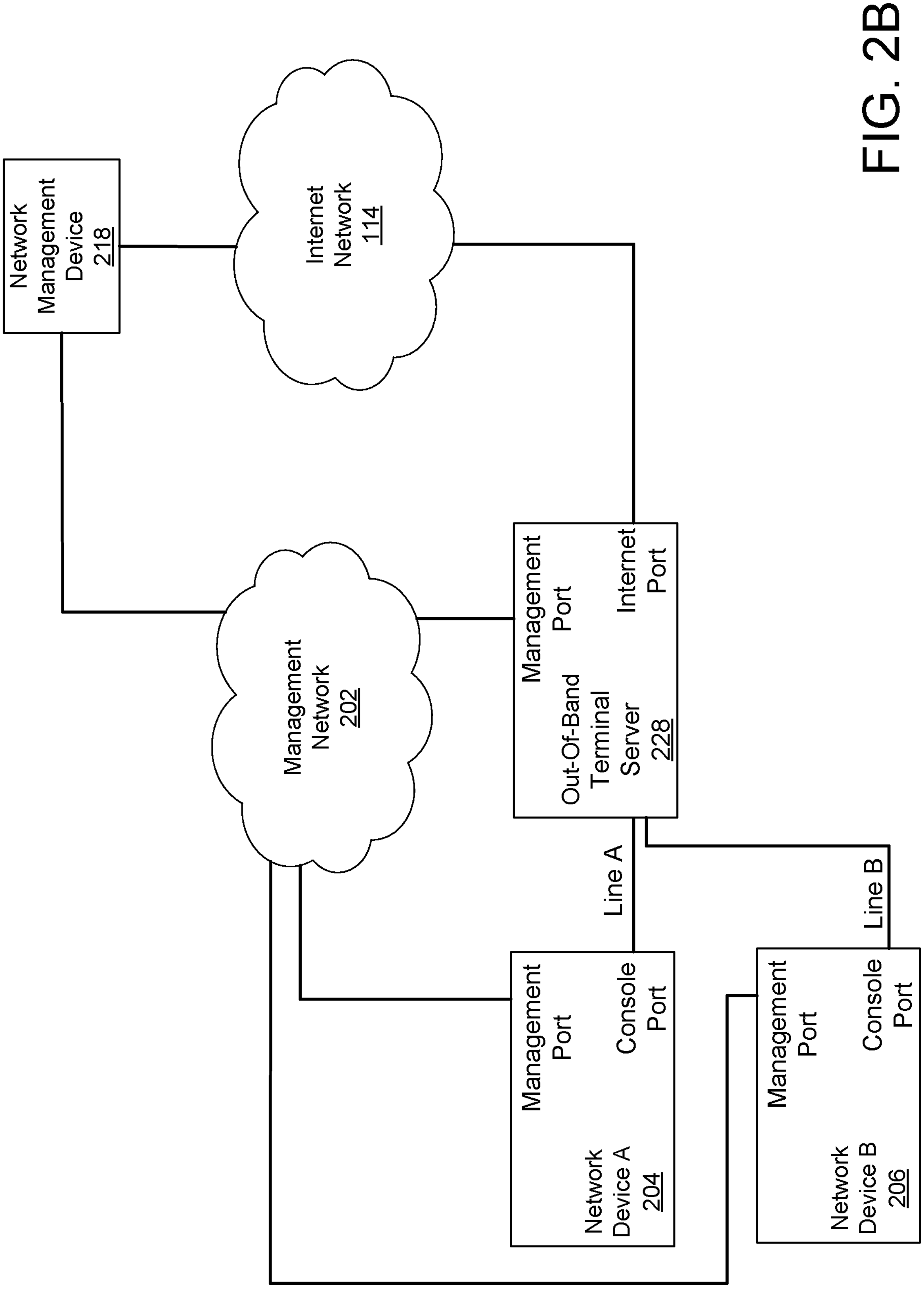
FIG. 2B is an example network environment for communicating with one or more network devices over an out-of-band device in accordance with one embodiment.

In addition to communicating with the network devices 204-210 over the management network 202, the network management device 218 may also connect to one or more network devices 204-210 through an out-of-band network device, such as out-of-band terminal server 228, as shown in FIG. 2B. In general, the terminal server 228 provides an out-of-band connection (or connection outside the routes established through the network 102) to one or more network devices. In the example shown, network management device 218 connects to network device A 204 and network device B 206 via management network 202 as described above. In other words, the network management device 218 may communicate and request information from network device A 204 and network device B 206 by transmitting requests for such information through management network 202. Network device A 204 and network device B 206 may include a management port (identifiable by an IP address for each port) that is configured to receive packets intended for the respective devices from management network 202. In addition, each network device 204-206 may include a console port for interacting or communicating with out-of-band devices, such as terminal server 228. The terminal server 228 may connect to the console ports of network device A 204 and network device B 206 through a line connection. In some instances, the terminal server 228 may include 24 lines to communicate with 24 separate network devices within a networking site. In the example illustrated, terminal server 228 communicates with network device A 204 via line A and with network device B 206 via line B.

Access to the terminal server 228, and thus the network devices 204-206 connected to the terminal server, may be accomplished through management network 202 or an Internet network 114 or other public network. Terminal server 228 may thus include a management port (identifiable by a management IP address) for receiving communications from management network 202 and an Internet port (identifiable by an IP address different than the management IP address) for receiving communications from the Internet network 114. In this manner, network management device 218 may communicate with terminal server 228 through either connection to log into or otherwise communicate with network devices 204-206.

Figure 3:
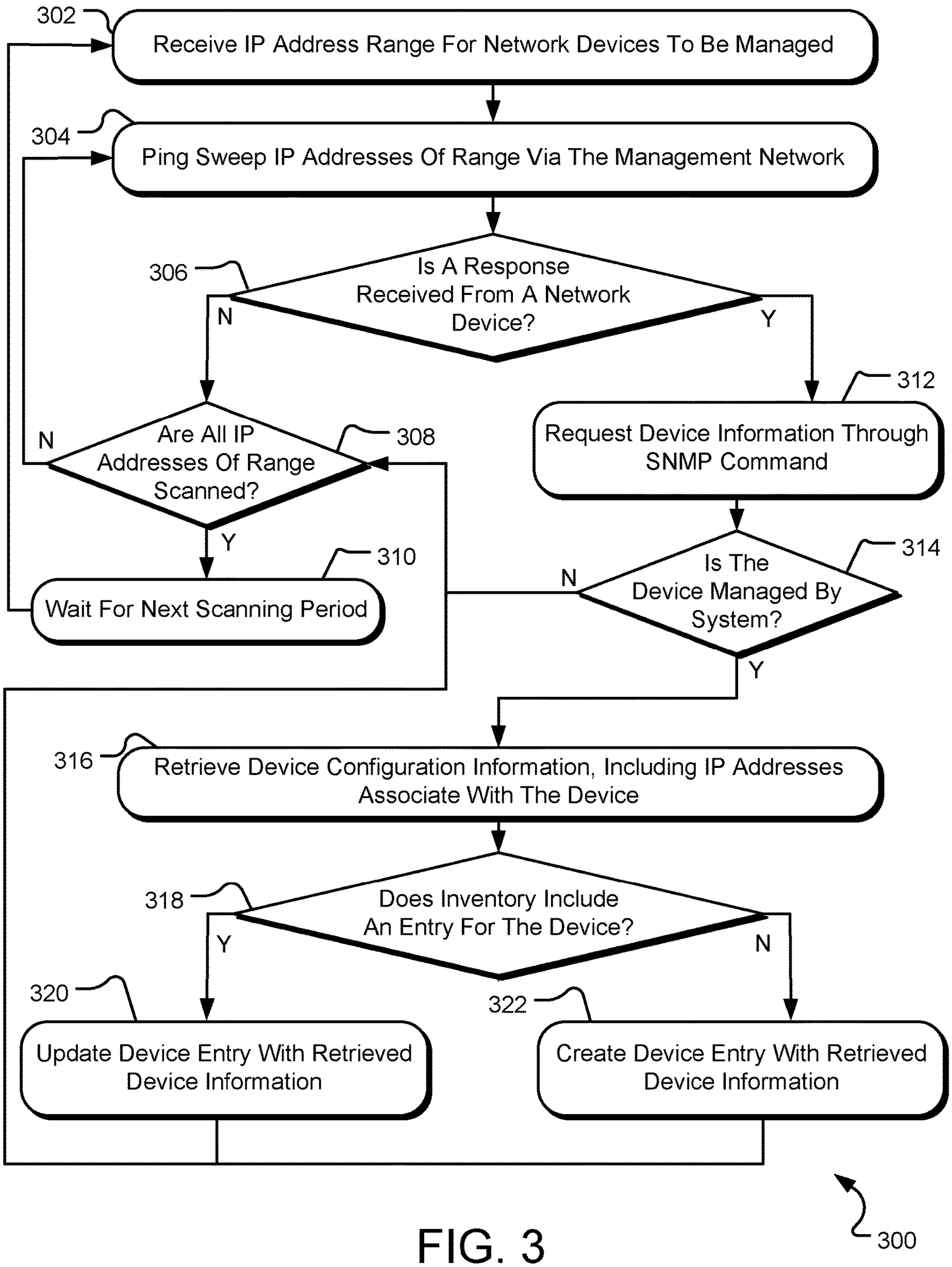
FIG. 3 is a method for automatically generating an inventory of network devices in accordance with one embodiment.

As mentioned above, the network management device 218 may be configured to scan the network 102 to identify and retrieve information from the network devices 204-210. FIG. 3 is a method 300 for the network management device 218 to scan the network 102 for network devices 204-210 and automatically generate an inventory of network devices in accordance with one embodiment. In general, the operations of the method 300 of FIG. 3 may be performed by the network management device 218 or any other components related to the network 200. The operations may be executed through one or more hardware components, one or more software programs, or a combination of both hardware and software components.

Beginning in operation 302, the network management device 218 may receive a list, block, or range of IP addresses corresponding to network devices 204-210 to be managed by the network management device. In some instances, each device of the network 102 may include an IP address within a particular range of addresses assigned to the network 102. The range of IP addresses may include any number of such address and may, in some instances, include multiple ranges of IP addresses such that the addresses used by the network 102 are not necessarily contiguous. In other instances, a list of such IP addresses may be obtained, at least in part, from stored routing information corresponding to the network 102. Such information may include, among other things, Border Gateway Protocol (BGP) routing information exchanged between gateways within the network and/or Internal Gateway Protocol (IGP) routing information exchanged within subnetworks/autonomous systems of the network 102.

In operation 304, the network management device 218 may sweep through the received range of IP addresses by transmitting, via the management network 202, a ping message or other message requesting a response from an associated device. The ping message may request some response from a device that receives the ping message at the current target IP address.

In operation 306, the network management device 218 determines if a response from a device 204-210 is received. For example, the network management device 218 may select a first IP address and transmit a request to that address for the receiving device to return a response to the request. In some instances, there may be no device associated with the IP address such that the ping message is not received at a device. If no response is received, the network management device 218 may determine if all IP addresses of the range of addresses has been scanned in operation 308. If not, the network management device 218 may return to operation 304 and ping at the next IP address in the range. If no additional IP addresses remain in the range to be scanned, the network management device 218 may wait for the next scanning period to begin in operation 310 and return to the beginning of the method 300. In this manner, the network management device 218 is configured to scan the range of IP addresses to determine devices connected to the management network 202 and included in the IP network 102. In some instances, the network management device 218 may be configured to scan through the range of IP addresses for the connected devices daily, monthly, hourly, etc. In general, the scanning period may be set for any amount of time.

Returning to operation 306, if the network management device 218 receives a response from a network device 204-210, the management device may investigate further to determine the type and condition of the responding device. In some examples, the response from the device at the IP address may include some identification of the device or may include an indication that the device is present and connected to the network. In operation 312, the network management device 218 may attempt to further identify the responding network device 204 by requesting device information from the network device 204. In one example, the request for device information may take the form of a Simple Network Management Protocol (SNMP) request for device status and information. Initially, the network management device 218 may request credentials from the network device to determine if the network device is managed by the network management system in operation 314. In some instances, devices accessed through the IP address sweep may be connected to the management network 202 but not managed by the network management system 126, such as third-party devices within the network 102 and/or devices managed by other entities such that these devices may not return the requested credentials. If the discovered device is not managed by the network management system 126, the network management device 218 may return to operation 308 to continue scanning the range of IP addresses for managed devices.

If the network device 204 returns the credentials, the network management device 218 may determine that the device is managed by the network management system 126. In operation 316, the network management device 218 may then request device information from the network device 204 through an additional SNMP command. The SNMP command requests the device to return device information and data, such as the IP addresses associated with the network device (including the IP address of the device and all IP addresses of communication ports of the device), current operating software versions, the type of device, a device name, a device model number, a device serial number, connectivity information, and the like. In general, any operating or identifying information of the network device 204 may be requested by the network management device 218 for inclusion in a network device inventory.

In operation 318, the network management device 218 determines if the corresponding network inventory 220 includes an entry associated with the discovered network device 204. For example, the inventory data 220, such as an inventory database, may include entries for each discovered network device 204-210 along with the information obtained about those devices. As new devices are added to the network, such devices may be discovered by the network management device 218 through the IP address sweep. Thus, if the network management device 218 determines that the inventory data 220 does not include an entry for the discovered network device, the network management device 218 may create such an entry in the inventory data 220 in operation 322 and associate the device information received from the device with the entry for that particular network device in the inventory data. If an entry already exists in the inventory data 220, the network management device 218 may compare the received network information to the existing entry and, if the information has changed, may update the entry in the inventory data 220 with the new device information. The network management device 218 may then return to operation 308 to continue the sweep through the IP range to discover other devices and obtain device information.

It should be appreciated that, although described as utilizing SNMP commands to retrieve device information, other protocols may be used instead of or in addition to SNMP to obtain the device information. For example, in certain implementations, Link Layer Discovery Protocol (LLDP) sessions with the network devices 204-210 may be used to obtain device information instead of or in addition to SNMP sessions. Notably, information obtained through an LLDP session may be used to obtain topology information regarding a given network device.

Figure 4:
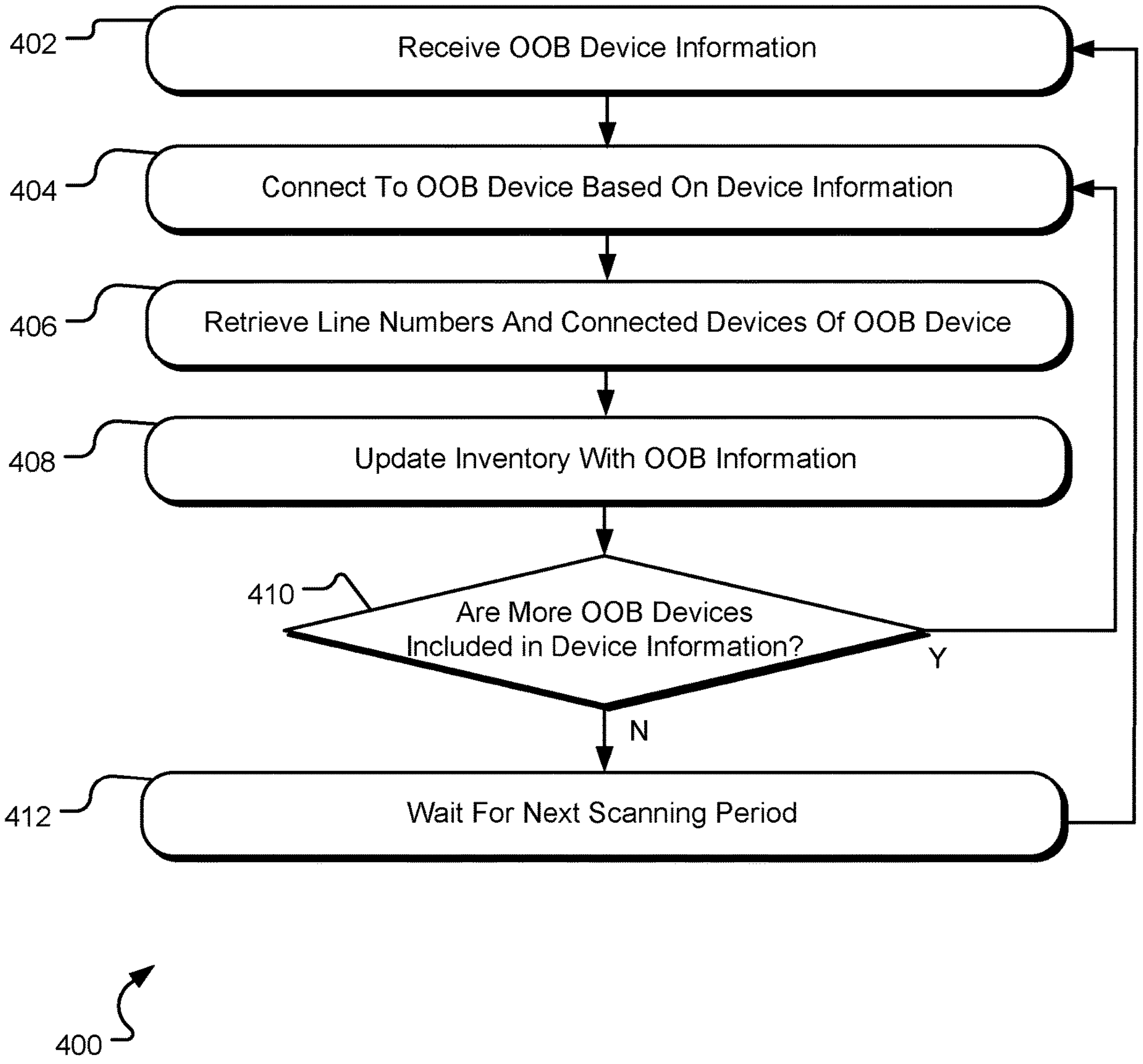
FIG. 4 is a method for automatically generating an inventory of out-of-band network devices associated with a network in accordance with one embodiment.

In some instances, the network device that is discovered through the method 300 described above may be an out-of-band device, such as a terminal server 228. When an out-of-band device 228 is discovered and identified through the information retrieved from the network device, the network management device 218 may further execute one or more of the operations of the method 400 of FIG. 4. In particular, FIG. 4 is a method 400 for automatically generating an inventory of out-of-band network devices associated with a network in accordance with one embodiment. Similar to the method 300 discussed above, the operations of the method 400 of FIG. 4 may be executed by the network management device 218 through hardware, software, or a combination thereof.

Beginning on operation 402, the network management device 218 receives device information for an out-of-band (OOB) network device 228, such as a terminal server. The device information may be received in a similar manner as described above through a scan of the IP addresses associated with the network 102. In operation 404, the network management device 218 may connect to the OOB device 228 based on the device information received. For example, the device information may include an IP address of a management port through which communications at the OOB device 228 may be received via the management network 202. In operation 406, the network management device 218 may request particular connectivity information from the OOB device 228, such as the number of line connections and the devices connected to those lines. For example, the terminal server 228 of FIG. 2B may be accessed to determine line A is connected to network device A 204 and line B is connected to network device B 206. Other OOB device 228 information may also be requested and obtained, such as IP addresses associated with the communication ports of the device, a model and serial number, a software version number, etc.

In operation 408, the network management device 218 may update the inventory data 220 according to the information received from the OOB device 228. For example, the network devices 204-206 connected to the OOB device 228 may be stored in the inventory data 220 for use by the network management device 218 for use in accessing such network device 204-206. In some instances, a link or other connection between the connected devices 204-206 and the OOB device 228 may be noted or otherwise included in the inventory data 220. In operation 410, the network management device 218 determines if additional OOB devices are discovered during the sweep through the IP addresses of the network 102. If more OOB devices are discovered, the network management device 218 may return to operation 404 to obtain the device information from those additional OOB devices. If no more OOB devices are discovered, the network management device 218 may wait for the next scanning period in operation 412 and as described above for additional discovered OOB devices.

Similar to the list of IP addresses, the network management device 218 may obtain information, at least in part, from one or more data sources in communication with the network management system 126. For example, the network management device 218 may be communicatively coupled with one or more similar inventory systems or databases maintained by a given network operator, each of which may contain information regarding the network devices 204-210. Accordingly, the network management system 126 is not necessarily limited to accessing device data collected by the network management device 218 using the previously discussed method of initiating communication sessions with each identified network device and retrieving respective device information through each session.

As previously discussed, device information for a particular network device may include information obtainable by interrogating the network device itself. However, device information may further include information regarding the physical and/or logical architecture of the network 102. For example, device information may include, among other things, a facility within which the device is located, an instance number associated with the device, a rack identifier associated with the logical rack number within which the device is located, or any other similar information regarding the network device's location (physical or logical) or role within the network 102.

Through method 300 and method 400, an inventory of the network devices 204-210 connected to the management network 202 and managed by the network management device 218 is generated and stored in the inventory data 220. Returning to FIG. 2A, these methods 300, 400 are partially illustrated in the network environment 200 through steps 1-3. Once the inventory data 220 is generated or updated, the network management device 218 may generate one or more DNS records corresponding to the network device information in steps 4 and 5 of the network environment 200 of FIG.

Figure 5:
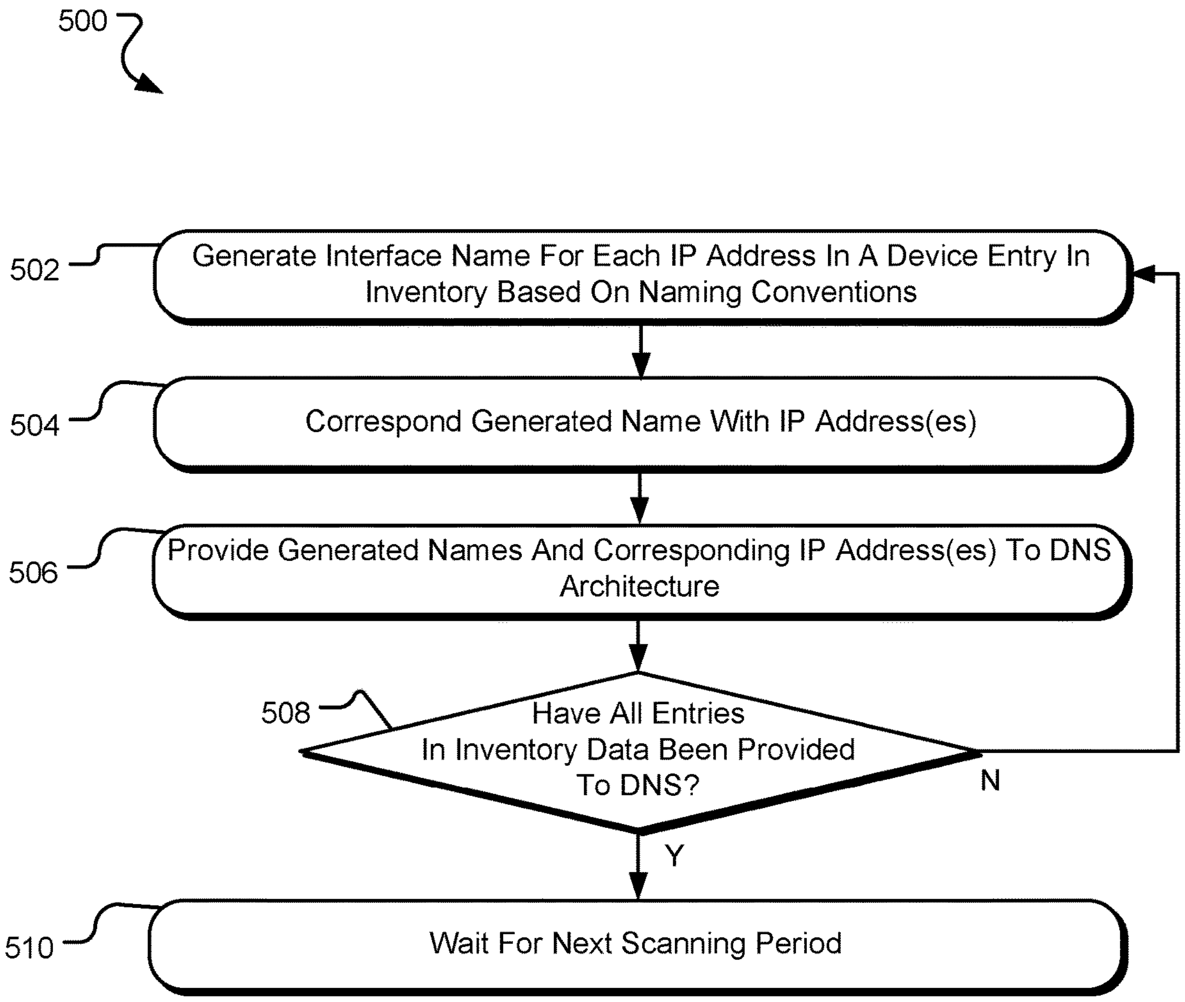
FIG. 5 is a method for generating one or more DNS records for device information stored in a network inventory in accordance with one embodiment.

2A. More particularly, FIG. 5 is a method 500 for generating one or more DNS records for device information stored in a network inventory in accordance with one embodiment. Similar to above, one or more of the operations of the method 500 may be performed by the network management device 218 through a hardware component or a software program.

Beginning in operation 502, the network management device 218 may generate device names for one or more of the network devices 204-210 identified in the scan of the IP addresses and for which device information was retrieved. For example, while most of the network devices 204-210 identified through the IP address scanning process may be accessed and/or managed by the network management device 218, some network devices may not be managed. For those devices in which the network management device 218 manages, a device name may be generated. In certain implementations, device names may be automatically generated by applying a collection of rules or logical tests (also known as "the naming convention") maintained within or otherwise accessible by the network management device 218 following retrieval of the device information. For example, the network management device 218 may execute a naming algorithm or set of rules that utilizes the device information as an input to generate the network name for the device based on the device information.

In some instances, the naming rules as applied by the network management device 218 may generate a multi-part device name with each part corresponding to an identifying characteristic of the network device. For example and without limitation, one example device name format may include three parts in the following, hyphen-separated format: <site>-<role>-<instance node>, where <site> is an alphanumeric string or code for a geographic site where the network device is located, <role> is an alphanumeric string or code identifying the network devices particular role (such as "edge", "router", "switch" etc.), and <instance node> is an alphanumeric string or code of an instance number or node identifier assigned to the network device (such as "1A", "1B", "A", etc.). Regarding the <role> field, example roles include, but are not limited to an out-of-band device, a management device, a spine, an edge leaf, a host leaf, a core firewall, an edge firewall, an edge router, or a particular type of server, each with a corresponding alphanumeric string that indicates the particular role of the device.

In some instances, the <instance node> field of the device name may indicate a sub-function of the particular device corresponding to the IP addresses or interface associated with the network. For example, the network device may include several IP addresses associated with interfaces of the device, such as communication ports of the device. In one particular example, a network device may be a router located in a New York site with a designation of NYC1 and include several Virtual Local Area Networks (VLANs) hosted by the router, with each VLAN associated with an IP address. The router may also include a management port associated with a separate IP address. Each of these IP addresses associated with the device may have a unique generated name. For example, the network management device 218 may generate the names NYC1-router-VLAN.999, NYC1-router-VLAN.998, and NYC1-router-VLAN.997 for each IP address associated with VLANs of the router and the name NYC1-router-Management_0 for the IP address associated with the management port of the router. Other devices in the same site may be associated with a similar naming convention, such as NYC1-edge-1A, NYC1-edge-1B, NYC1-switch-A, etc. In still other examples, the generated device interface name may include more than three fields. In general, the naming convention provides for a root name that identifies the particular device and one or more sub-fields that identifies the particular interface of that device.

The foregoing format for a device/interface name is intended merely as an example that has a hierarchical structure that may be relatively intuitive for network operators and technicians to work with. Nevertheless, implementations of the present disclosure are not limited to the foregoing device name/interface format. For example, depending on the size and complexity of a given network, more or fewer fields may be included in the device name/interface format and/or the device/interface name format may include one or more different fields than those included in the example. Ultimately, implementations of the present disclosure enable network operators to generate custom rules that may be applied to the collected device information to automatically generate device/interface names in a format specified by the network operator. As a result, a network operator may adapt the network management device 218 to generate network device/interface names that are specifically designed for the network maintained by the operator and the particular practices, conventions, and similar policies adopted by the network operator.

In operation 504, the network management device 218 may correspond or associate the generated interface names with the IP addresses of the network data 220. Using the example above, the network management device 218 may associate the generated interface name NYC1-router-VLAN.999 with an IP address associated with that router/port as stored in the inventory data 220. One or more of the IP addresses stored in the inventory data 220 may similarly be associated with a device/interface name that is generated by the network management device 218. The corresponding device/interface name and IP address may form a DNS record or DNS record information that is based on the network device information stored in the inventory data 220. For example, in one implementation, the network management device 218 may generate one or more of A records (for devices having an IPv4 address), AAAA records (for devices having an IPv6 address), or CNAME records for each of the network devices/interfaces of the network devices. Alternatively to generating actual DNS records, the network management device 218 may instead generate some or all of the data to be stored in such records. In the case of A and AAAA records, for example, the network management device 218 may generate, for each network device 204-210, a record or data including, among other things, a hostname and an IP address. In general, the DNS record generated by the network management device 218 correlates an IP address obtained from the network 102 and/or network devices through the process described above with a generated device/interface name.

In operation 506, the network management device 218 may provide the generated interface names and corresponding to a DNS architecture for storage and access. For example, the network management device 218 transmits the generated records or otherwise updates DNS records 226 maintained by the DNS hosting system 222. The transmitted DNS records may cause the DNS hosting system 222 to add a new DNS record to the stored DNS records 226, or update or delete an existing DNS record. For example, if a particular IP address is no longer utilized in the network devices 204-210, a DNS record corresponding to that IP address may be removed. Similarly, if a network device is removed from the network architecture, the corresponding DNS records of that device may be removed from the DNS records 226.

Once updated in this manner, the DNS server 224 of the DNS hosting system 222 may be queried by the network management device 218 with the generated interface name to quickly receive the corresponding IP addresses for accessing corresponding network devices. For example, the network management device 218 (or a user of the network management device 218) may provide an interface name to the DNS server 224. The DNS server 224 may, through execution of DNS lookup algorithms, obtain an IP address corresponding with the provided name from the DNS records 226. The DNS server 224 may then return the IP address to the network management device 218 in response to the provide interface name. In this manner, the IP addresses of the interfaces of the network devices 204-210 may be accessed quickly through the DNS hosting system 222 in a similar manner as other DNS requests. Such DNS queries from the network management device 218 may be implemented, for example, in one or more devices or tools for facilitating management, maintenance, supervision, and operation of the network 102 in which access to one or more of the network devices 204-210 may be used.

In operation 508, the network management device 218 may determine if the entries in the inventory data 220 that are associated with an IP address have been provided to the DNS hosting system 222 for storage and retrieval. If not, the network management device 218 may return to operation 502 to continue generating DNS records for the interfaces in the inventory data 220. If no additional records are to be sent to the DNS hosting system 222, the network management device 218 may wait for the next scanning period in operation 510 when additional network information may be stored and new or updated DNS information may be provided to the DNS hosting system 222. In this manner, the network management device 218 may correlate generated device/interface names of the network devices 204-210 with the corresponding IP addresses for the device/interface and provide such records to the DNS hosting system 222 for use in quickly obtaining the IP addresses of the network devices 204-210.

Figure 6:
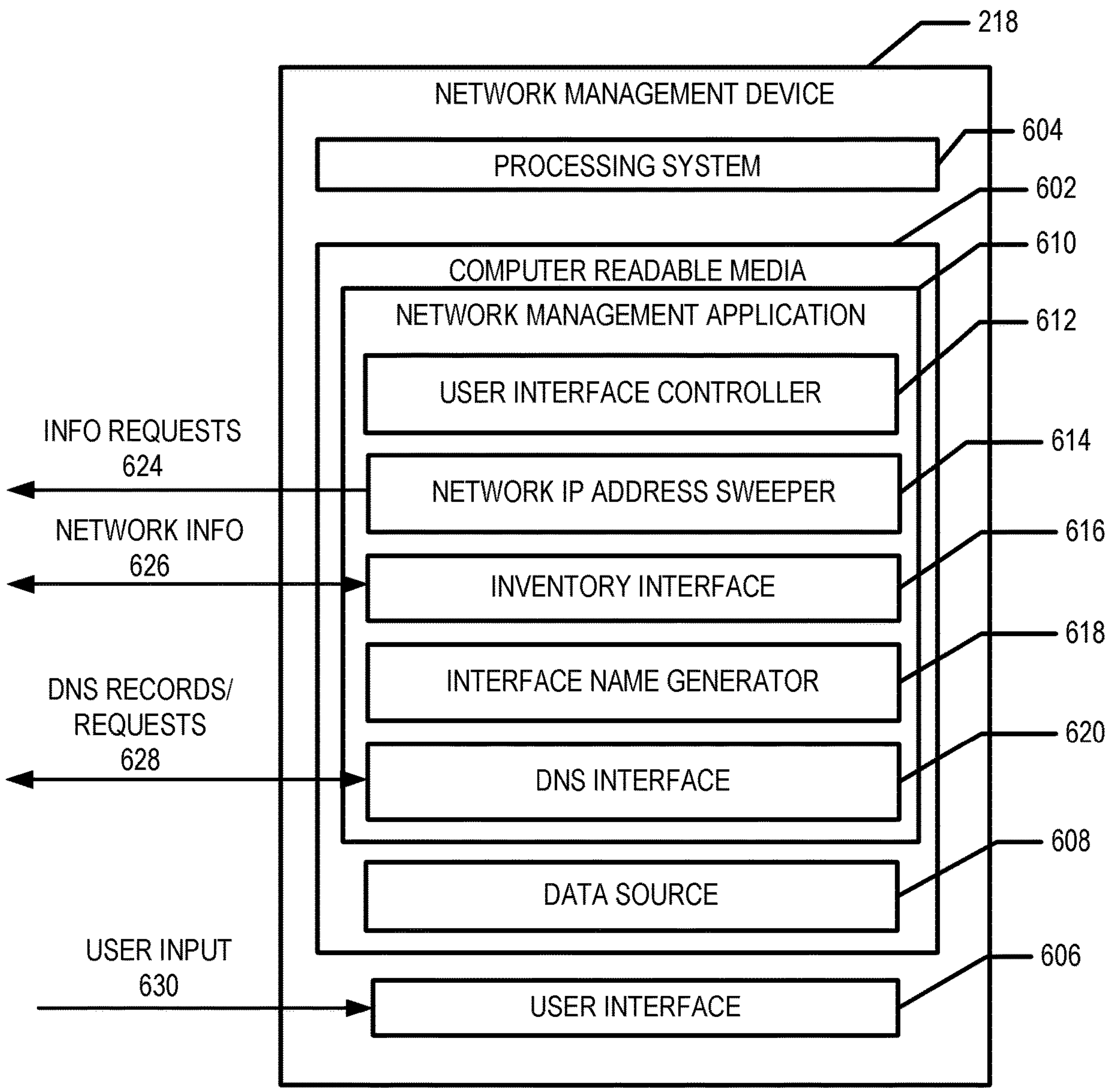
FIG. 6 is a network management computing system for a telecommunications network in accordance with one embodiment.

FIG. 6 is a network management device 218 for a telecommunications network in accordance with one embodiment. The network management device 218 of FIG. 6 may include and execute a network management application 610 to perform one or more of the operations described above. The network management application 610 may be stored in a computer readable media 602 (e.g., memory) and executed on a processing system 604 of the network management device 218 or other type of computing system, such as that described below. For example, the network management application 610 may include instructions that may be executed in an operating system environment, such as a Microsoft Windows™ operating system, a Linux operating system, or a UNIX operating system environment. The computer readable medium 602 includes volatile media, nonvolatile media, removable media, non-removable media, and/or another available medium. By way of example and not limitation, non-transitory computer readable medium 602 comprises computer storage media, such as non-transient storage memory, volatile media, nonvolatile media, removable media, and/or non-removable media implemented in a method or technology for storage of information, such as computer readable instructions, data structures, programs, or other data.

According to one embodiment, the network management device 218 also provides a user interface (e.g., a command line interface (CLI), a graphical user interface (GUI), etc.) 606 displayed on a display, such as a computer monitor, for displaying data. Through the user interface 606, a user of the network management device 218 may provide customer input 630 through one or more input devices. The customer input 630 may be used by the network management device 218 to, among other things, provide the range of IP addresses for the network devices 204-210 used to sweep through the network, provide one or more naming conventions, select a particular device to retrieve information about the device from the inventory data 220, provide a DNS request to the DNS hosting system 222, and the like. The input device for providing the customer input 630 may include, among others, a keyboard or a pointing device (e.g., a mouse, trackball, pen, or touch screen) to enter data into or interact with the user interface 606.

In one example, the user interface 606 may communicate with other components in the network management application 610 to receive user input for manipulating or otherwise modifying the operation of the network management application. For example, user interface controller 612 may communicate with user interface 606 to receive customer input 630 for use by the network management application 610. The user interface controller 612 may also provide information to for display via the user interface 606, such as components and services included in the network infrastructure associated with a customer or user of the network management system 600.

The network management application 610 may also utilize a data source 608 of the computer readable media 602 for storage of data and information associated with the network management system 600. For example, the network management application 610 may store the received IP address range of the network devices 204-210, store the naming convention algorithm or other information associated with generating an interface name, and the like. In general, any data or information utilized by the network management application 610 may be stored and/or retrieved via the data source 608.

The network management application 610 may include several aspects to perform one or more of the operations described herein. For example, a network IP address sweeper 614 may be included that is configured to sweep through the provided IP address range or ranges of the network devices 204-210 and transmit one or more requests 624 for device information from discovered devices. Further, an inventory interface 616 may be included in the network management application 610 that provides information 626 received from network devices 204-210 to an inventory storage device or devices. The inventory interface 616 may also request and receive network information stored in the inventory data 220 to provide in the user interface 606 based on one or more inputs 630 provided by a user of the interface 606. For example, a user may request, via the user interface 606, information associated with a network device 204 which may trigger the inventory interface 616 to request and receive such information.

The network management application 610 may also include a device/interface name generator 618 configured to execute a naming algorithm to generate a name corresponding to one or more interfaces of the network devices 204-210 as stored in the inventory data 220. The naming convention executed by the interface name generator 618 may be similar to that as described above. The interface name generator 618 may provide the generated names to the inventory interface 616 for storage in the inventory data 220, in some instances. The network management application 610 may also include a DNS interface 620 for communicating with the DNS hosting system 222 to provide the generated DNS records 628 (corresponding generated names and interface IP addresses) to the DNS hosting system 222 for storage. As explained in more detail below, the DNS records 628 may aid the network management device 218 (or a user of the network management device 218) in accessing network devices 204-210 to manage the network 102.

Figure 7:
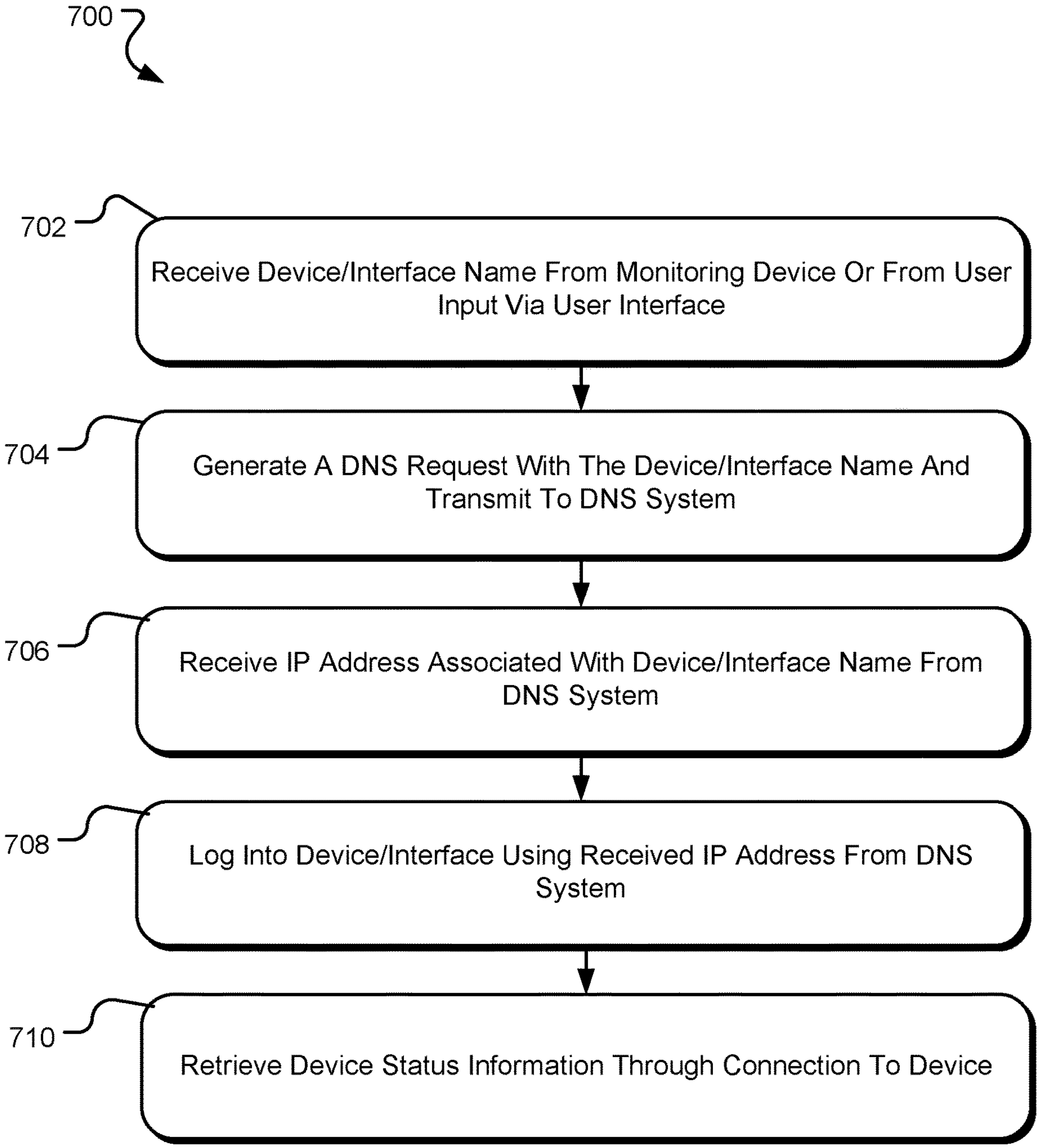
FIG. 7 is a method for utilizing one or more DNS records for device information stored in a network inventory to access a network device in accordance with one embodiment.

FIG. 7 is a method 700 for utilizing one or more DNS records for device information stored in a network inventory to access a network device in accordance with one embodiment. Similar to the methods above, the operations of the method 700 of FIG. 7 may be performed by network management device 218, through hardware components, software programs, or a combination of hardware and software components. In some instances, the operations of the method 700 may begin in response to one or more inputs provided to the network management device 218 from a user of the device, such as through a user interface 606.

Beginning in operation 702, the network management device 218 may receive a device/interface name from a device monitoring the network or from a user via an input to the user interface. For example, the network management system 126 may include a device that monitors the network devices 204-210 to changes in operating status of the devices. In some instances, a change in operating status may generate an alarm that is transmitted to the monitoring device. A change in operating status may include the device losing connectivity to the network, the device rebooting, receiving an alarm from a connected device that may be forwarded to the monitoring device, and the like. In some instances, the alarm received from the device may include the generated device name and/or interface on which the alarm condition is detected. In still other instances, the operations center of the network 102 may receive an indication of change in operating status of a device with little information about the nature of the change in status. In these instances, a user of the network management device 218 may attempt to log into the affected device to obtain more information about the affected device. Thus, the user may provide the device/interface name to the network management device 218, such as through a command line of the user interface 606. The user, in this example, may be aware of a generic naming convention of the network 102 such that manually generating the device/interface name may be a simple process for the user to accomplish. Regardless of whether the device/interface name is received from a monitoring device or a user, it is often beneficial to investigate any generated alarm in the network to ensure proper and speedy operation of the network 102. In this manner, the network management device 218 may aid the monitoring device or user in obtaining additional information from the network 102.

In operation 704, the network management device 218 may generate a DNS request to the DNS hosting system 222 and provide the received device/interface name in the request. The DNS hosting system 222 may resolve the device/interface name to an IP address and return the IP address to the requesting device, i.e., the network management device 218. Through the operations above, the DNS hosting system 222 may include a DNS record associated with the device/interface name such that one or more IP addresses may be obtained from the DNS hosting system 222. In operation 706, the network management device 218 receives the corresponding IP address to the device/interface name from the DNS hosting system 222.

With the IP address of the device/interface received, the network management device 218 may attempt to log into the device/interface associated with the received alarm in operation 708. In particular, the network management device 218 may receive the device/interface name (from the monitoring device or from the user) and substitute in the corresponding IP address for the device/interface. Thus, the user or monitoring device may not be familiar or otherwise know the IP address for the target device/interface. Rather, the user or monitoring device may simply provide the device/interface name, as determined by the naming convention, and the corresponding IP address may be automatically populated into the network management device 218 as received from the DNS hosting system 222. Further, because the DNS records 226 of the network 102 are discovered, generated, and provided by the network management device 218 from the sweep of the network devices 204-210, the DNS records may be up-to-date to the current network topology and connectivity. The automatic generation of the IP address of any device/interface of the network 102 may remove the need for manual look-up of such addresses and improve the speed and accuracy of the network management.

In some instances, the device/interface is not accessible through the IP address due to one or more network issues preventing connection to the device through the management portal of the device. The network management device 218 may, in such instances, the network management device 218 may log into the device through an OOB connection with the device. For example, the network management device 218 may attempt to log into the device through a terminal server 228, either through the management port or the Internet port of the terminal server. OOB log-in by the network management device 218 may occur if the network device 204 is rebooting or otherwise not processing received communications. By logging into the device through an OOB device, the status of an otherwise unresponsive device may be determined or received. The IP address for connecting to network devices through an OOB device 228 may similarly be obtained through a DNS request to the DNS hosting system 222. For example, the network management device 218 may attempt to log into the device through the received IP address for the device/interface received from the DNS hosting system 222. If the log-in is unsuccessful, such as through a time-out procedure, the network management device 218 may obtain OOB information for the device from the inventory data 220, such as which terminal server 228 and which line of the terminal server to which the network device 204 is connected. The network management device 218, or a user of the network management device 218, may generate a name/interface request to the DNS hosting system 222 to access the terminal server and/or the line of the terminal server to access the affected network device 204 through the console port of the device. In this manner, the DNS hosting system 222 may also provide OOB connection information for the target network device.

In operation 710, the network management device 218 may retrieve information, such as a status of the device, information concerning a received alarm, status of other devices connected to the device, routing tables stored at the device, etc. In general, the information provided to the network management device 218 may aid in the management and configuration of the network 102 and network devices 204-210. For example, the network management device 218 may, during operation of the network 102, receive an alarm or other indicator of the status of the network 102. A user of the network management device 218 or the network management device 218 itself may investigate the alarm by logging into the device that provided the alarm or another device associated with the alarm. Through the operations above, the network management device 218 or user may not need to know the various IP addresses of the devices at issue to use to log into those devices remotely. Rather, the user or network management device 218 may provide the name of the target device (based on the naming convention) into the network management device 218. The network management device 218 may then provide the device name to the DNS hosting system 222 to resolve the name into an IP address of the device or interface at issue. The IP address may be utilized to log into the device, transmit a request for information to the device, or any other method to obtain status and operational information from the target device/interface. With the obtained information, the user or network management device 218 may respond to the alarm through any network management or configuration commands.

In some instances, the DNS records 226 may be used to trace a path through the network 102 without knowing each IP address of the devices along the path. Rather, the user or network management device 218 may access a first network device (using the name of the device) and obtain routing information or tables from that device. An analysis of the routing tables may provide the network management device 218 with one or more other devices connected to the target device. With those other devices known, a user or the network management device 218 may access one of the other devices (through the same procedure as above using a name of the device), continuing along a path through the network 102. Thus, a user or network management device 218 may trace a path through the network 102, accessing devices along the path, to determine any issues or problems of devices/interfaces along a routing path.

In addition to accessing the device through a management portal, the network management device 218 may also access devices through an OOB device 228, as described. Such access may be useful when the management port cannot be reached due to devices status or network issues. Providing an alternate path to the device to retrieve device information further allows a network administrator access to the devices without the need to memorize the numerous IP addresses of the network devices.

Figure 8:
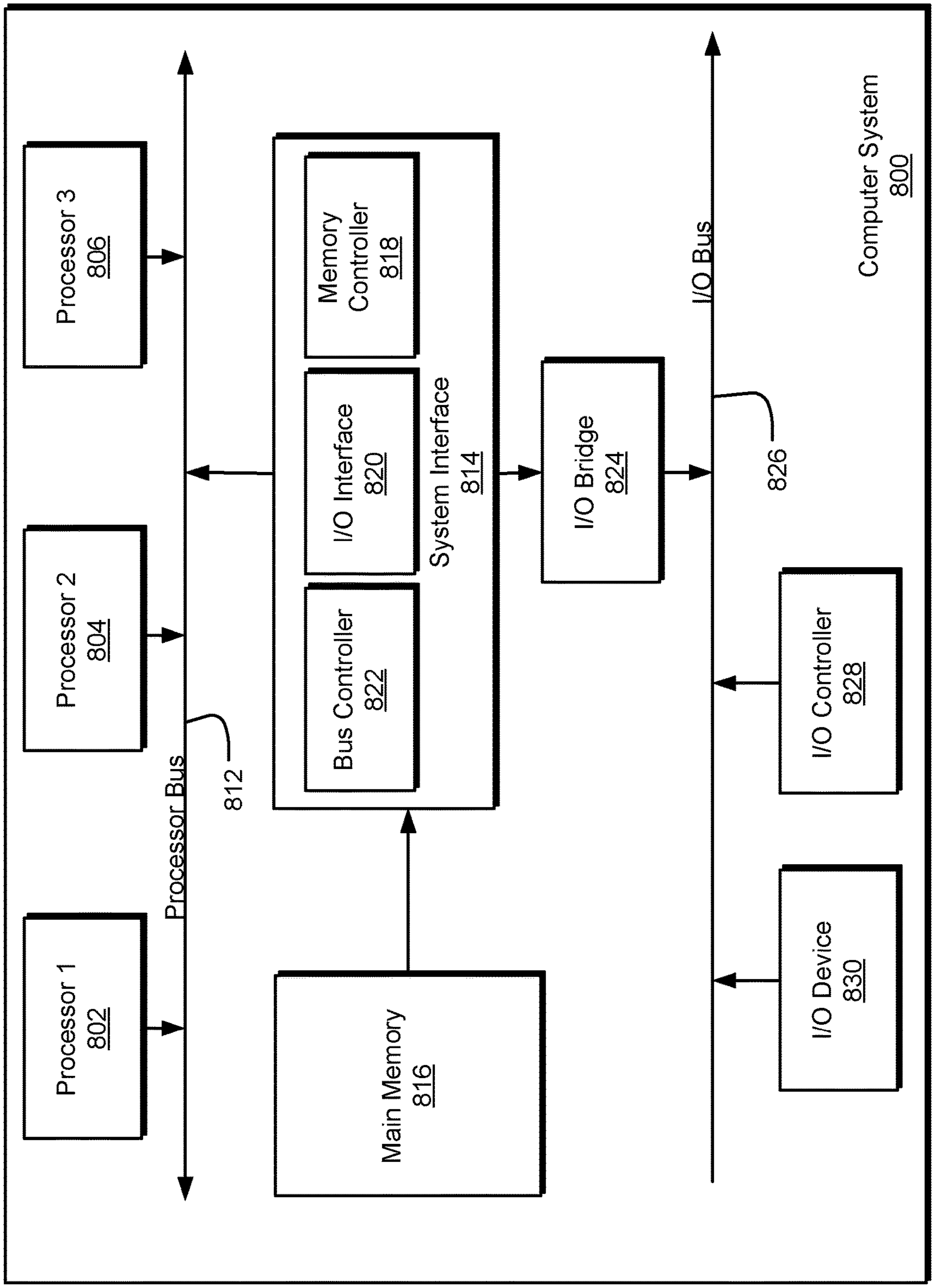
FIG. 8 is a diagram illustrating an example of a computing system which may be used in implementing embodiments of the present disclosure.

FIG. 8 is a block diagram illustrating an example of a computing device or computer system 800 which may be used in implementing the embodiments of the components of the network disclosed above. For example, the computing system 800 of FIG. 8 may be the network management system 218 discussed above. The computer system (system) includes one or more processors 802-806. Processors 802-806 may include one or more internal levels of cache (not shown) and a bus controller or bus interface unit to direct interaction with the processor bus 812. Processor bus 812, also known as the host bus or the front side bus, may be used to couple the processors 802-806 with the system interface 814. System interface 814 may be connected to the processor bus 812 to interface other components of the system 800 with the processor bus 812. For example, system interface 814 may include a memory controller 814 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. One or more I/O controllers and/or I/O devices may be connected with the I/O bus 826, such as I/O controller 828 and I/O device 830, as illustrated.

I/O device 830 may also include an input device (not shown), such as an alphanumeric input device, including alphanumeric and other keys for communicating information and/or command selections to the processors 802-806. Another type of user input device includes cursor control, such as a mouse, a trackball, or cursor direction keys for communicating direction information and command selections to the processors 802-806 and for controlling cursor movement on the display device.

System 800 may include a dynamic storage device, referred to as main memory 816, or a random access memory (RAM) or other computer-readable devices coupled to the processor bus 812 for storing information and instructions to be executed by the processors 802-806. Main memory 816 also may be used for storing temporary variables or other intermediate information during execution of instructions by the processors 802-806. System 800 may include a read only memory (ROM) and/or other static storage device coupled to the processor bus 812 for storing static information and instructions for the processors 802-806. The system set forth in FIG. 8 is but one possible example of a computer system that may employ or be configured in accordance with aspects of the present disclosure.

According to one embodiment, the above techniques may be performed by computer system 800 in response to processor 804 executing one or more sequences of one or more instructions contained in main memory 816. These instructions may be read into main memory 816 from another machine-readable medium, such as a storage device. Execution of the sequences of instructions contained in main memory 816 may cause processors 802-806 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 816, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A network management system comprising:

a network management device comprising a processor and a non-transitory computer readable medium storing instructions that, when executed by the processor, cause the network management device to:

receive, in response to transmitting a plurality of requests for response, a response from a responding network device of a network, wherein each request of the plurality of requests for response comprises a destination address included in a range of Internet Protocol (IP) addresses associated with the network;

transmit, based on the response from the responding network device, a request for information associated with the responding network device;

generate a unique device name for the responding network device;

update a domain name system (DNS) server with a DNS record associated with the responding network device, the DNS record comprising the unique device name and an IP address associated with the responding network device; and receive information associated with an out-of-band (OOB) network device, the OOB network device communicating via a console port of the responding network device, wherein the network management device communicates with the responding network device via a management port different than the console port.

2. The network management system of claim 1, wherein the network management device is further caused to:

receive, via a user interface, an input identifying the unique device name; and transmit a DNS request to the DNS server for the IP address associated with the responding network device, the DNS request comprising the unique device name.

3. The network management system of claim 2, wherein the network management device is further caused to:

receive, via the DNS server, the IP address associated with the responding network device; and transmit a communication to the responding network device in response to an alarm condition associated with the responding network device, the communication comprising a destination address field comprising the received IP address.

4. The network management system of claim 1, further comprising:

a network device inventory database storing device information of components of a telecommunications network, wherein the network management device further stores, in the network device inventory database, the information associated with the responding network device.

5. The network management system of claim 1, wherein the information associated with the responding network device further comprises at least one IP addresses associated with at least one network device in communication with the responding network device.

6. The network management system of claim 1, wherein the information associated with the OOB network device comprises an IP address associated with the OOB device and a line identifier for communicating via the console port of the responding network device, and wherein the network management device is further caused to:

generate a unique device name for the responding network device; and associate the information associated with the OOB device with the responding network device.

7. The network management system of claim 1, wherein the unique device name comprises a type of network device and an identifier of a location of the responding network device.

8. A method of managing a telecommunications network comprising:

accessing, by a network management computing device and via a first internet protocol (IP) address of a range of IP addresses, device information associated with a network device of a network, the range of IP addresses associated with the network;

generating, via an instruction for configuring a device name, at least one unique device name for the network device;

updating a domain name system (DNS) server to include a record for the network device, the record including the first IP address of the device and the unique device name;

transmitting, to the DNS server, a DNS request to retrieve the IP address of the network device, the request comprising the unique device name of the network device; and receiving information associated with an out-of-band (OOB) network device, the OOB network device communicating via a console port of the responding network device, wherein the network management computing device communicates with the responding network device via a management port different than the console port.

9. The method of claim 8 further comprising:

identifying the network device by scanning the range of IP addresses, wherein scanning the range of IP addresses comprises transmitting a request for information for at least a portion of the range of IP addresses.

10. The method of claim 9, wherein the range of IP addresses is a predetermined block of IP addresses associated with the network.

11. The method of claim 8, further comprising:

obtaining the device information associated with the network device by:

initiating a Simple Network Management Protocol (SNMP) session with the network device utilizing the first IP address; and requesting the device information associated with the network device via the SNMP session.

12. The method of claim 11, wherein the device information comprises verification information of the network device, the method further comprising:

verifying, via the verification information of the network device, the identity of the network device.

13. The method of claim 8, wherein the unique device name comprises a networking type of the network device and an identifier of a geographic location of the network device.

14. The method of claim 8, further comprising:

receiving, via the DNS, the IP address the IP address of the network device; and auto-populating a user interface with the IP address of the network device, the user interface configured to transmit a communication to the network device in response to an alarm condition associated with the network device.

15. The method of claim 8, wherein updating the DNS server to include the record for the network device comprises accessing an application programming interface (API) configured to translate communications transmitted to the DNS server.

16. The method of claim 8, wherein the IP address of the network device is associated with a communication interface of the network device, the network device comprising a plurality of communication interfaces.

17. A communications network comprising:

a networking device addressable via a first Internet Protocol (IP) address;

a network management device configured to:

receive, in response to transmitting a plurality of requests for response, a response from the networking device, wherein each request of the plurality of requests for response comprises a destination address included in a range of IP addresses associated with a network, the first IP address of the range of IP addresses;

transmit, to the networking device and addressed via the first IP address, a request for device information;

generate, via an instruction for configuring a device name and in response to receiving information from the networking device in response to the request for device information, at least one unique device name for the networking device;

transmit, via an Application Programming Interface (API) and to a Domain Name System (DNS) server, a DNS record comprising the first IP address and the at least one unique device name for the networking device; and transmit, to the DNS server, a DNS request to retrieve the first IP address of the networking device, the DNS request comprising the unique device name of the networking device; and an out-of-band (OOB) networking device addressable via a second IP address, the OOB networking device communicating via a console port of the network device and the network management device communicating with the network device via a management port of the network device, the management port different than the console port.

18. The communications network of claim 17, further comprising:

a database in communication with the network management device, the database storing the device information received in response to the request for device information.

* * * * *